No. 790,996.

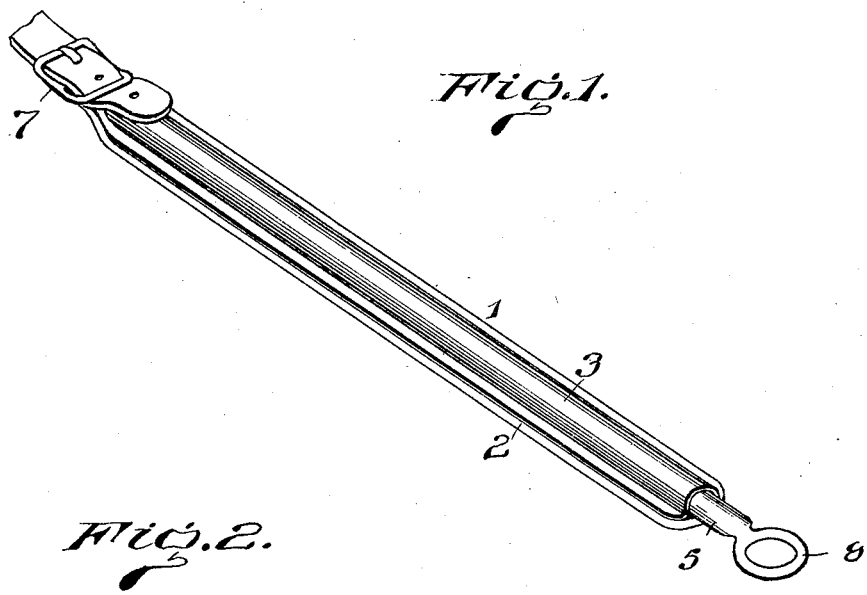
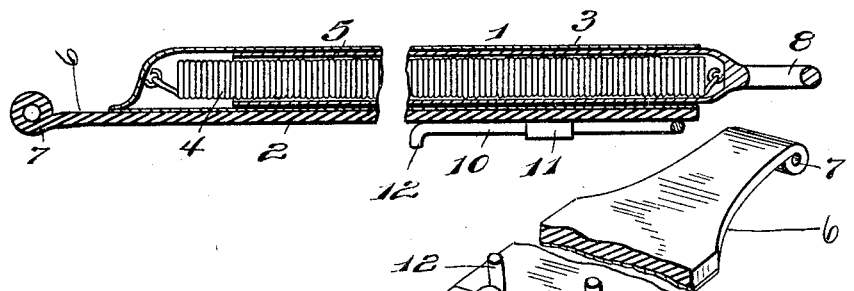
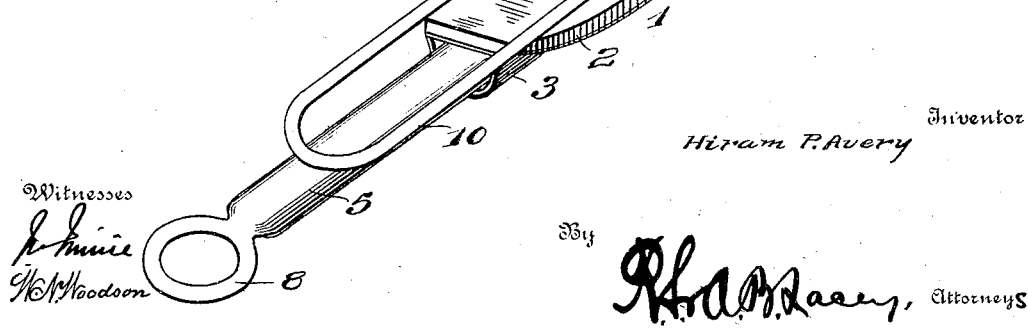

Patented May 30, 1905.

UNITED STATES PATENT OFFICE.

HIRAM P. AVERY, OF BEARDSTOWN, ILLINOIS, ASSIGNOR OF ONE-THIRD TO SYLVESTER BARTLETT, OF BEARDSTOWN, ILLINOIS.

CHECKREIN.

SPECIFICATION forming part of Letters Patent No. 790,996, dated May 30, 1905.

Application filed February 17, 1905. Serial No. 246,100.

*To all whom it may concern:*

Be it known that I, HIRAM P. AVERY, a citizen of the United States, residing at Beardstown, in the county of Cass and State of Illinois, have invented certain new and useful Improvements in Checkreins, of which the following is a specification.

This invention relates to improvements in harness; and the essential object of the invention is to secure a novel form of yielding check which may be readily used in the customary manner for holding the head of the horse back, but which permits the animal to stretch his head and move it in all directions.

The rigid checkreins most commonly in use at present hold the head of the animal in such a position that the head movement is limited to an extent which often makes the horse untractable, and it is designed to obviate the above disadvantage in the provision of the elastic or yielding checkrein which comprises this invention.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view of check means embodying the invention. Fig. 2 is a vertical longitudinal sectional view. Fig. 3 is a perspective view looking toward the under side of the check, the same being extended as when under tension.

Corresponding and like parts are referred to in the following description and indicated in all the views of the drawings by the same reference characters.

In carrying out the invention the check device embodying the same consists, essentially, of a housing 1, closed at one end and open at the opposite end. The housing 1 is of peculiar form, comprising a base 2 and a hollow or tubular body portion 3. The base 2 of the housing 1 is preferably made of leather and the body 3 of metal in order to stiffen the housing longitudinally thereof. The housing 1 receives a coil-spring 4, one end of which is secured to the housing, preferably at the closed end thereof, the opposite end being received in a shield 5, which preferably telescopes in the housing 1 aforesaid. The spring 4 is secured to the shield and the latter is preferably of hollow form to receive the spring, so that when the parts of the check device are extended under tension the spring 4 will not be exposed, but will be effectively housed in the said parts 1 and 5, to which it is attached. The spring 4 may be of metal, rubber, or the like within the contemplation of the invention, and the provision of the shield 5 is of the utmost importance in that the spring is thoroughly protected from the elements and is not likely to become rusted or rendered unserviceable from any other cause. The base of the housing 1 projects some distance beyond the closed end of the body 3, as shown at 6, and to this extended portion is secured a buckle 7 of any suitable form. The buckle 7 is utilized to connect the check device at one end to the line or other part of harness, according to the particular use to which the device may be applied. The shield 5, which is made of metal preferably, projects from the housing 1 at the open end thereof under normal conditions or when the spring 4 is holding the part 5 at the limit of its movement toward the closed end of the housing 1. The outer end of the shield 5 is provided with a loop 8 in order to connect the check device at the end opposite the buckle 7 with the part to which it may be applied.

The construction of the check device is very simple, and the same may be utilized in various ways in connection with harness. As an overdraw the checkrein may be cut away for a distance about the length of the check device, and the buckle 7 may then be attached to the forward portion of the checkrein, the loop 8 receiving the check-hook of the harness-saddle. The device will then admit of free movement of the head of the animal in any direction, normally tending, however, to hold the head back in order to accomplish the checking function for which it is designed. The device may also be utilized in connection with the double checkrein, and in this instance the position of the invention would be reversed, the buckle 7 being connected with the crupper-strap near its rear end portion and suitably held in place thereon, the loop 8 being connected with the checkreins and located near the harness-saddle forwardly of the buckle in a manner which will be obvious. The stiffening of the housing 1 is very important in that the said housing is always maintained rigid, so as to permit free movement of the shield 5 into and out of the same. At the same time the stiffening for the housing prevents the same from getting out of shape, due to exposure to the elements, and this is very desirable in this class of devices.

Under some conditions it may be desirable to make the check device inelastic or non-extensible and for this purpose a sliding member 10 is secured to the under side of the base 2 of the housing and comprises a U-shaped loop made of rigid material. The sides of the member 10 are slidably mounted in guides 11 upon the under side of the base, and the inner extremities of the said sides are formed with projections 12, which prevent displacement of the part 10 from the housing. Normally the member 10 is disposed beneath the base 2; but by sliding said member the curved portion thereof may be projected from an end of the housing 1, so that a connecting part may be passed through the part 10 and the loop 8, the part 10 rigidly preventing outward movement of the spring 4 in a manner apparent.

Having thus described the invention, what is claimed as new is—

1. In a check of the class described, the combination of a housing, a spring in said housing, a loop connected with one end of the spring, and a sliding member carried by the housing and coöperating with the loop to prevent expansive movement of the spring.

2. In a check of the class described, the combination of a housing, a spring in said housing, a loop at one end of the spring for connecting the same to a harness part, and a loop member slidably mounted upon the housing and coöperating with the loop of the spring to prevent expansive movement of said spring, said loop member having means for limiting the sliding movement thereof.

In testimony whereof I affix my signature in presence of two witnesses.

HIRAM P. AVERY. [L. S.]

Witnesses:
PAT. BRANDOM,
WILHELM SCHENDEL.